US012618472B2

(12) United States Patent
Treier et al.

(10) Patent No.: US 12,618,472 B2
(45) Date of Patent: May 5, 2026

(54) COMPRESSION SEALING GASKET AND SEALING SYSTEM

(71) Applicant: GENERAL ELECTRIC TECHNOLOGY GMBH, Baden (CH)

(72) Inventors: Lukas Treier, Oberentfelden (CH); Thomas Berteloot, Villeurbanne (FR); Maxime Perret, Oberentfelden (CH); Bernhard Spichiger, Oberentfelden (CH)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/881,496

(22) PCT Filed: Jul. 13, 2023

(86) PCT No.: PCT/EP2023/069467
§ 371 (c)(1),
(2) Date: Jan. 6, 2025

(87) PCT Pub. No.: WO2024/013289
PCT Pub. Date: Jan. 18, 2024

(65) Prior Publication Data
US 2025/0305584 A1 Oct. 2, 2025

(30) Foreign Application Priority Data
Jul. 13, 2022 (EP) ..................................... 22306053

(51) Int. Cl.
*F16J 15/10* (2006.01)
*F16L 23/22* (2006.01)
*H01H 33/56* (2006.01)

(52) U.S. Cl.
CPC ............. *F16J 15/106* (2013.01); *F16L 23/22* (2013.01); *H01H 33/565* (2013.01)

(58) Field of Classification Search
CPC ........ F16J 15/106; F16L 23/22; H01H 33/565
See application file for complete search history.

(56) References Cited

U.S. PATENT DOCUMENTS 2,599,767 A * 6/1952 Long ........................ F16L 23/22
277/913
2,789,844 A * 4/1957 Kessler ................... F16L 23/22
285/365

(Continued)

FOREIGN PATENT DOCUMENTS

DE 8800117 U1 3/1988
DE 4201535 A1 7/1993

(Continued)

OTHER PUBLICATIONS

Extended European Search Report issued in EP Application No. 22306053.4 dated Dec. 13, 2022, 9 pages.

(Continued)

*Primary Examiner* — Eugene G Byrd
(74) *Attorney, Agent, or Firm* — Eversheds Sutherland (US) LLP

(57) ABSTRACT

A compression sealing gasket having a main body of general planar extension, or extending in a plane, including an inner side and an outer side, and end faces, which delimit the gasket along an axis perpendicular to the plane, and connect the inner side and the outer side, made of an elastomer material, the main body having a first extension, along the axis, at least one of the inner side and the outer side being provided with a lip which has a second extension, along the axis perpendicular to the plane, less than the first extension.

15 Claims, 7 Drawing Sheets

(56)                 References Cited

U.S. PATENT DOCUMENTS

| | | | | |
|---|---|---|---|---|
| 3,191,949 A * | 6/1965 | Lansky | .................. | F16J 15/106 |
| | | | | 277/596 |
| 3,620,539 A * | 11/1971 | Lanier | .................... | F16J 15/106 |
| | | | | 277/606 |
| 3,727,926 A * | 4/1973 | Berry | .................... | F16J 15/106 |
| | | | | 285/350 |
| 3,746,348 A * | 7/1973 | Stone | .................... | F16J 15/106 |
| | | | | 277/609 |
| 3,819,211 A * | 6/1974 | Knox | .................. | F16L 17/067 |
| | | | | 285/363 |
| 3,990,711 A * | 11/1976 | Hill | ......................... | F16J 15/32 |
| | | | | 277/910 |
| 5,947,533 A * | 9/1999 | Fisher | .................... | F16L 23/22 |
| | | | | 285/364 |
| 6,039,319 A * | 3/2000 | Coonce | .................. | F16L 23/22 |
| | | | | 277/318 |
| 6,073,969 A * | 6/2000 | Zimmerly | ............... | F16L 23/22 |
| | | | | 285/12 |
| 6,234,545 B1 * | 5/2001 | Babuder | ................. | F16L 23/22 |
| | | | | 285/364 |
| 2009/0014963 A1 * | 1/2009 | Fietz | .................... | F16J 15/025 |
| | | | | 277/402 |
| 2010/0320699 A1 * | 12/2010 | Takeda | ................... | F16L 23/22 |
| | | | | 277/612 |

| | | | | |
|---|---|---|---|---|
| 2012/0074694 A1 * | 3/2012 | Butte | ..................... | F16L 23/12 |
| | | | | 277/609 |
| 2019/0001540 A1 * | 1/2019 | Yui | ..................... | H01M 8/0271 |
| 2019/0049015 A1 * | 2/2019 | Mackel | .................. | F16J 15/106 |
| 2020/0132195 A1 * | 4/2020 | Coombs | ................ | F16J 15/106 |
| 2020/0141494 A1 * | 5/2020 | Sakaguchi | ........ | H05K 7/20272 |
| 2021/0025497 A1 * | 1/2021 | Tsuji | ..................... | F16J 15/104 |
| 2021/0262570 A1 * | 8/2021 | Brown | ................ | F16J 15/0818 |
| 2022/0090682 A1 * | 3/2022 | Cox | ...................... | F16J 15/028 |
| 2022/0373088 A1 * | 11/2022 | Gal | ........................ | F16J 15/062 |
| 2025/0267814 A1 * | 8/2025 | Mueller | ................ | F16J 15/061 |

FOREIGN PATENT DOCUMENTS

| | | | | |
|---|---|---|---|---|
| DE | 102004018587 A1 | 11/2005 | | |
| DE | 102012101384 A1 * | 8/2013 | .......... | F16J 15/0818 |
| EP | 3330580 A1 | 6/2018 | | |
| EP | 3502521 A1 | 6/2019 | | |
| FR | 2997223 A1 | 4/2014 | | |
| JP | 08121599 A * | 10/1994 | ............. | F16L 23/22 |
| JP | H10257619 A | 9/1998 | | |
| WO | WO-2017131559 A1 * | 8/2017 | .............. | F16J 15/02 |

OTHER PUBLICATIONS

International Search Report and Written Opinion for PCT/EP2023/069467, dated Oct. 24, 2023, 16 pages.

* cited by examiner

COMPRESSION SEALING GASKET AND SEALING SYSTEM

TECHNICAL FIELD

The invention concerns a compression sealing gasket designed to reduce its permeability to gas and/or to outer water or water vapor.

The sealing gasket is intended to be implemented on medium and high voltage gas insulated apparatuses, at the connection between two parts.

PRIOR ART

Some medium and high voltage apparatuses comprise hollow components in which conductors are arranged.

An insulating gas fills these components, to isolate the conductors carrying current at a high voltage from the hollow components which are at ground potential.

The insulating gas is also able to withstand the electric field over short distances between conductors arranged in the component.

The connection between two components comprises for example a tubular part for each component and a sealing gasket placed between the tubular parts.

According to a known embodiment, the sealing gasket is made of an elastomer and is compressed between components, for example two tubular parts or one tubular part and a flat plate.

The compression of the two components or parts produces an elastic deformation of the gasket, improving the tightness of the connection.

However, the gasket is generally made of an elastomer that has a permeability to the insulating gas.

One object of the invention is to provide a sealing gasket having a significantly lower permeability, in order to reduce the leakage rate for a complete apparatus.

The aim is to reach for the overall arrangement a leakage rate less than 0.5% vol/year as described in the relevant IEC standards for switchgear, for example IEC 62271-203 for gas insulated switchgear.

This improvement is of particular interest since the industry moves towards insulating gases, consisting of gases or gas mixtures, that may leak differently due to the different characteristics of those new molecules used compared to the prevailing $SF_6$ gas that has been used for decades.

In particular, a gas called "g3" comprising heptafluoroisobutyronitrile mixed with a dilution gas comprising carbon dioxide and oxygen is used in replacement of $SF_6$. $CO_2$ has a strong propensity to leak. $O_2$ and $N_2$ also leak, but less than $CO_2$. These 3 gases have a higher susceptibility to leak than $SF_6$. These leaks pose problems because of the adverse effect of $CO_2$ on the environment; furthermore, the lost gas must also be replaced, which involves further costs due to maintenance operations.

Another object of the invention is to provide an improved sealing gasket having a significantly lower permeability to heptafluoroisobutyronitrile and/or heptafluoroisopropyl trifluoromethyl ketone (also named 2-butanone, 1,1,1,3,4,4,4-heptafluoro-3-(trifluoromethyl)-(CAS No 756-12-7) and/or $CO_2$ and/or $O_2$ and/or $N_2$, and/or to water or water vapor, in particular in gas insulated apparatuses of the type mentioned above or in this application, more generally in any high voltage or medium voltage components, like disconnectors, or switches, or circuit breakers, or gas insulated lines, implemented in medium or high voltage applications.

Indeed such a gas may contain:

heptafluoroisobutyronitrile, alone or mixed with with $O_2$ and/or $CO_2$ and/or $N_2$;

and/or heptafluoroisopropyl trifluoromethyl ketone, alone or mixed with $O_2$ and/or $CO_2$ and/or $N_2$;

or $CO_2$, alone or in a mixture with $O_2$, and/or with $N_2$;

$N_2$, alone or in a mixture with $O_2$ and/or $CO_2$.

Furthermore, $H_2O$ is not wanted inside such devices, and another object of the invention is to provide a sealing gasket reducing or limiting or avoiding permeation of $H_2O$ from the outside of such a gas insulated apparatus implemented in medium or high voltage applications.

BRIEF DESCRIPTION OF THE INVENTION

The invention concerns a gasket or a sealing gasket or a sealing system or a sealing gasket system or a compression sealing gasket or a compression sealing gasket system (any of these expressions can be used in the rest of this description), comprising a main body of general planar extension, or extending in a plane, comprising an inner side and an outer side, made of an elastomer material, said main body having a $1^{st}$ extension (or $1^{st}$ thickness) ($L_{14}$), along an axis perpendicular to said plane, at least one of said inner and outer side being provided with a lip which has a $2^{nd}$ extension (or $2^{nd}$ thickness), along said axis perpendicular to said plane, less than the $1^{st}$ extension (or $1^{st}$ thickness).

The lip offers a smaller surface area to gas and/or water permeating in a direction contained in the plane of the main body. Preferably, the lip(s) and the main body are homogeneous in terms of composition.

Permeation (molecules going through the gasket by diffusion) is linked to the surface area under pressure. Due to its smaller extension or thickness along the axis perpendicular to the plane in which the gasket extends, the lip offers a reduced surface to permeation.

The main body, which has a larger extension along the axis, is to ensure ageing, thermal dilatation, manufacturing tolerances, factory handling and environmental constraints.

A gasket or a sealing gasket or a sealing gasket system or a compression sealing gasket or a compression sealing gasket system according to the invention is very tight and efficient against leaks of heptafluoroisobutyronitrile and/or heptafluoroisopropyl trifluoromethyl ketone (also named 2-butanone, 1,1,1,3,4,4,4-heptafluoro-3-(trifluoromethyl)-(CAS No 756-12-7)) and/or $CO_2$ and/or $O_2$ and/or $N_2$ and/or an oxygenated compounds and/or water vapor and/or incoming water leaks and/or incoming water vapor, for example in applications implementing a gas which comprises both $CO_2$ and a fluorinated compound, heptafluoroisobutyronitrile and/or heptafluoroisopropyl trifluoromethyl ketone, at a pressure comprised between 1 bar and 20 bar.

According to a preferred embodiment, the lip has a compression rate or an average compression rate higher than the main body.

Preferably:

the $1^{st}$ extension (or the thickness of the gasket) is comprised between 2 and 25 mm, and/or the $2^{nd}$ extension is comprised between 0.5 mm and 5 mm.

A gasket or a sealing gasket or a sealing gasket system or a compression sealing gasket or a compression sealing gasket system according to the invention can have an inner dimension (the dimension of the inner part of the gasket) which is for example comprised between 40 mm (or 100 mm) and 500 mm (or even 1300 mm).

For example, if it has an annular shape, an inner diameter of the gasket can be comprised between 40 mm or 100 mm and 500 mm or even 1300 mm.

A gasket or a sealing gasket or a sealing gasket system or a compression sealing gasket or a compression sealing gasket system according to the invention fits at the interface between both components, at least one of them comprising a recess comprising a $1^{st}$ part which receives the main body and possibly a $2^{nd}$ part which receives said lip.

Each of said parts can have a rectangular shape, the length of the $1^{st}$ part along the axis perpendicular to the plane of the gasket can be equal, larger or smaller than the length of the gasket can be equal, larger or smaller than the length of the $2^{nd}$ part along said axis.

In particular embodiments of a gasket or a sealing gasket or a sealing gasket system or a compression sealing gasket or a compression sealing gasket system according to the invention:

said outer side and said inner side can be parallel and/or coaxial to each other;

and/or the gasket has in a plane perpendicular to said axis (AA') an annular or oval or ellipsoidal shape.

In another embodiment of a gasket or of a sealing gasket or of a sealing gasket system or of a compression sealing gasket or of a compression sealing gasket system according to the invention, at least one of said outer side, said inner side and of the end faces that axially delimit the gasket and connect the inner side and the outer side, has a wavy or corrugated shape.

In a particular embodiment of a gasket or of a sealing gasket or of a sealing gasket system or of a compression sealing gasket or of a compression sealing gasket system according to the invention, each of said inner side and said outer side can be provided with a lip.

In another particular embodiment of a gasket or of a sealing gasket or of a sealing gasket system or of a compression sealing gasket or of a compression sealing gasket system according to the invention, the lip has a side, perpendicular to said axis, extending in a same plane as one of said end faces; the gasket has thus an "L" shape.

In another particular embodiment of a gasket or of a sealing gasket or of a sealing gasket system or of compression sealing gasket or of a compression sealing gasket system according to the invention, the extension (or thickness) $L_{14}$ of the main body can be larger than the distance between its inner side and its outer side (measured in a plane perpendicular to the axis AA' or in the plane of the gasket). This applies to an "L" shaped gasket, but also to any other embodiment.

The invention also concerns a gasket or compression sealing system or of a sealing gasket or of a sealing gasket system or of a compression sealing gasket or of a compression sealing gasket system, comprising two gaskets according to the invention in series, the lip of one of said gaskets connecting to one of the inner side and the outer side of the other one of said gaskets. For example, the lip of the inner side of one of said gaskets is connected to the outer side of the other gasket; or the lip of the outer side of one of said gaskets is connected to the inner side of the other gasket.

The invention also concerns a sealing system or a sealing gasket system or a compression sealing gasket or a compression sealing gasket system, comprising two components, in which each of the components comprises an end or assembly face that faces the end or assembly face of the other component, at least one of them having a recess as mentioned above, and wherein at least part of a gasket or of a compression sealing gasket or of a sealing gasket or of a sealing gasket system or of a compression sealing gasket system according to the invention is arranged in said recess. Part of said compression sealing gasket, for example one or more lip(s), may be arranged outside said recess.

Preferably, the gasket or the compression sealing gasket or the sealing gasket or the sealing gasket system or the compression sealing gasket system is axially compressed by the end or assembly faces.

The end or assembly faces of the two components may be contacting each other, or not (in which case, part of the gasket, for example one or more lip(s) or at least part of one or more lip(s), may not be in a recess), for example in at least an area surrounding the recess and/or the gasket.

Said components may form part of a gas insulated portion of a high or medium voltage apparatus, said portion:

containing, or being intended to contain, a gas, for example at a pressure between 1 bar and 20 bar, said gas for example comprising at least:

heptafluoroisobutyronitrile and/or heptafluoroisopropyl trifluoromethyl ketone (also named 2-butanone, 1,1,1,3,4,4,4-heptafluoro-3-(trifluoromethyl)-(CAS No 756-12-7)), possibly mixed with a gas or a dilution gas comprising at least $CO_2$ and/or $O_2$ and/or $N_2$ and/or an oxygenated compound;

or comprising at least $CO_2$ and/or $O_2$ and/or $N_2$ and/or an oxygenated compound;

and/or said gas insulated portion being surrounded, or being intended to be surrounded, by an outer atmosphere containing some water and/or water vapor.

Said components may be at least partly cylindrical and can be arranged coaxially to each other and to a main axis AA', said end or assembly face of each component extending in a plane perpendicular to said main axis AA'.

The invention also concerns a method for insulating a gas insulated portion of a high or medium voltage apparatus, said gas insulated portion:

containing a gas comprising for example at least a fluorinated compound, for example heptafluoroisobutyronitrile and/or heptafluoroisopropyl trifluoromethyl ketone possibly mixed with a gas or a dilution comprising at least $CO_2$ and/or $O_2$ and/or $N_2$ and/or an oxygenated compound and/or water vapor, or said gas comprising for example at least $CO_2$ and/or $O_2$ and/or $N_2$ and/or a fluorinated compound, for example heptafluoroisobutyronitrile, said gas insulated portion comprising a gasket or a sealing system or a sealing gasket or a sealing gasket system or a compression sealing gasket or a compression sealing gasket system according to the invention;

and/or said gas insulated portion being surrounded, or being intended to be surrounded, by an outer atmosphere containing some water and/or water vapor.

The invention also concerns a method for insulating a gas insulated portion of a high or medium voltage apparatus, said gas insulated portion:

containing a gas comprising at least:

a fluorinated compound, for example heptafluoroisobutyronitrile and/or heptafluoroisopropyl trifluoromethyl ketone possibly mixed with a gas or a dilution gas comprising at least $CO_2$ and/or $O_2$ and/or $N_2$ and/or an oxygenated compound and/or water vapor, or $CO_2$ and/or $O_2$ and/or $N_2$ and/or an oxygenated compound, and/or water vapor, and/or said gas insulated portion being surrounded, or being intended to be surrounded, by an outer atmosphere containing some water and/or water vapor;

said gas insulated portion comprising two components, at least one of them having a recess as mentioned above, in which each of the components comprises an end or assembly face that faces the end or assembly face of the other component and wherein at least part of a gasket or of a compression sealing gasket or of a sealing gasket or of a sealing gasket system or of a compression sealing gasket system or of a sealing system according to the invention, is arranged in said at least one recess and is compressed between the end or assembly faces of the components.

The invention also concerns a method for insulating a gas insulated portion of a high or medium voltage apparatus, said gas insulated portion containing a gas comprising at least $CO_2$ and/or $O_2$ and/or $N_2$ and/or an oxygenated compound and/or water vapor and/or a fluorinated compound, for example heptafluoroisobutyronitrile and/or heptafluoroisopropyl trifluoromethyl ketone, and/or said gas insulated portion being surrounded, or being intended to be surrounded, by an outer atmosphere containing some water and/or water vapor, said gas insulated portion comprising a gasket according to the invention or a sealing system or a sealing gasket or a sealing gasket system or a compression sealing gasket or a compression sealing gasket system according to the invention.

Said gas can be contained in said apparatus at a pressure between 1 bar and 20 bar.

DETAILED DESCRIPTION OF PARTICULAR EMBODIMENTS

Figure 1:
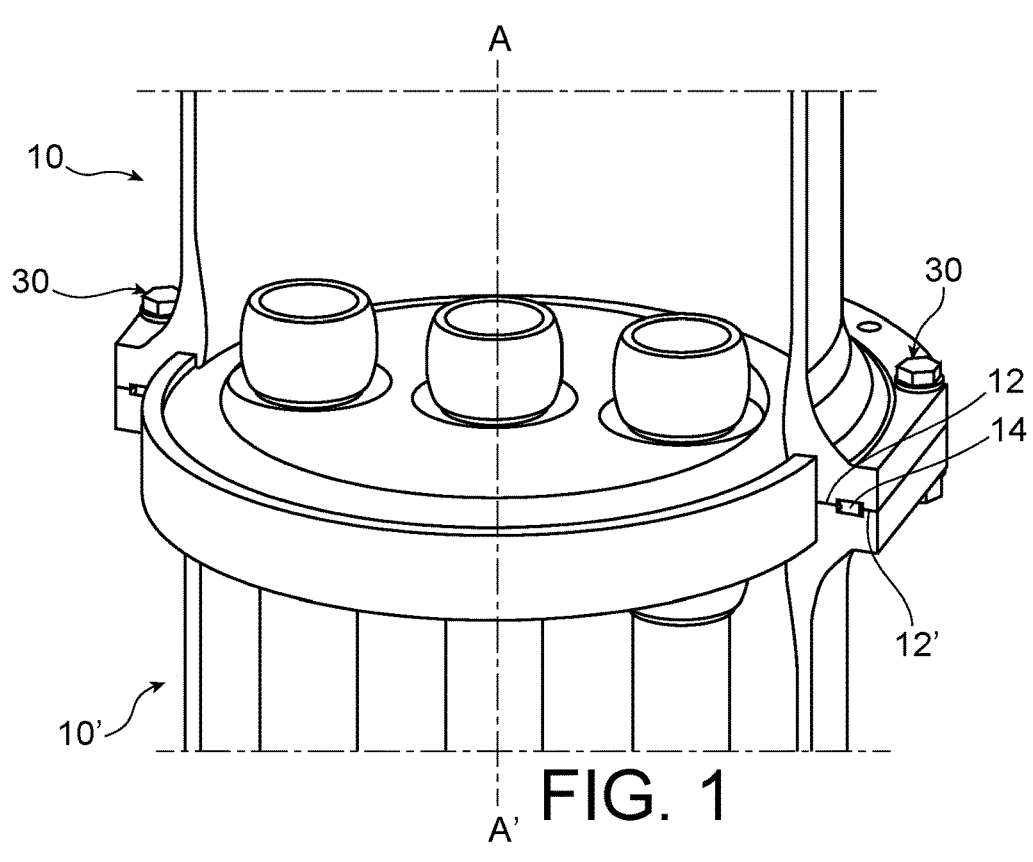
FIG. 1 is a schematic diagram of a high voltage apparatus comprising two components assembled together using a gasket according to the invention.

FIG. 1 illustrates an example of a system according to the invention to which a gasket or a compression sealing gasket or a sealing gasket or a sealing gasket system or a sealing system or a compression sealing gasket system according to the invention can apply. It comprises a portion of a high voltage apparatus comprising components 10, 10' assembled one to the other. Here, each component 10, 10' is represented as a cylindrical and tubular component and extends coaxial to a main axis AA' of the high voltage apparatus. It will be understood that the two components may be of any other shape; for example, they may be non-cylindrical tubular parts.

Alternatively, one of the components, or both of them, may be a non-tubular part, for example a hole 100 of a gas compartment (FIG. 9) closed by a flange 101.

Alternatively, a gasket or a compression sealing gasket or a sealing gasket or a sealing gasket system or a sealing system or a compression sealing gasket system according to the invention can be used for example at the interface between two flanges. The following description is made with reference to tubular elements, but the invention applies to any other pair of elements, the interface of which must be sealed, in particular to:

a gas like heptafluoroisobutyronitrile and/or heptafluoroisopropyl trifluoromethyl ketone (also named 2-butanone, 1,1,1,3,4,4,4-heptafluoro-3-(trifluoromethyl)-(CAS No 756-12-7)), possibly mixed with a gas or a dilution gas comprising at least $CO_2$ and/or $O_2$ and/or $N_2$ and/or and/or an oxygenated compound;

or to a gas comprising at least $CO_2$ and/or $O_2$ and/or $N_2$ and/or an oxygenated compound, and/or water vapor;

and/or to incoming water and/or incoming water vapor, said interface being surrounded, or being intended to be surrounded, by an outer atmosphere containing some water and/or water vapor.

Said gas can have a pressure (P2) between 1 bar and 20 bar, for example 5 bar or 15 bar.

Figure 2:
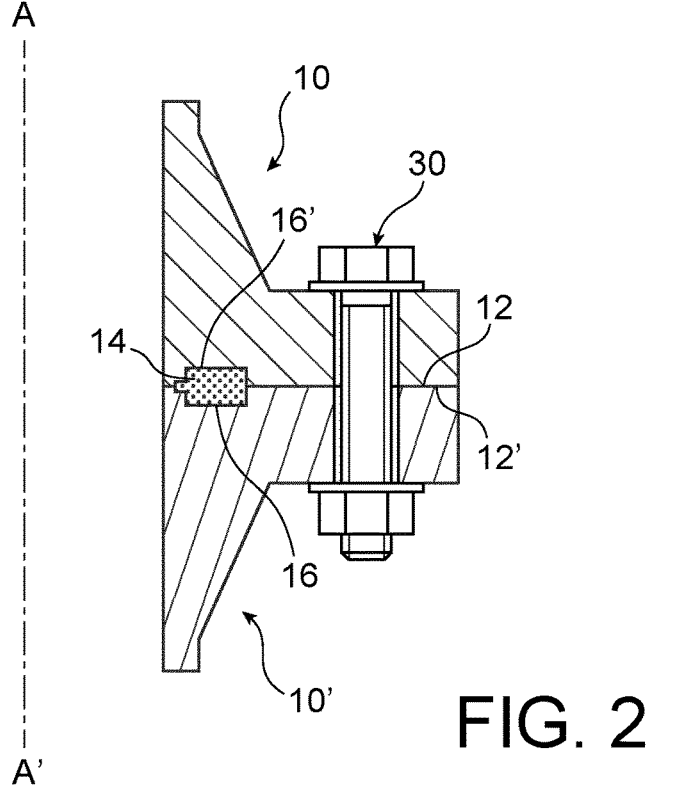
FIG. 2 a detail of the assembly of the components of FIG. 1 showing how a gasket according to the invention is received between the two components.

As can be seen in more details in FIG. 2, each component 10 comprises an end (or assembly) face 12 which faces, and possibly is connected, to the end (or assembly) face 12' of the other component 10'.

A gasket or a sealing system or a compression sealing gasket or a sealing gasket or a sealing gasket system or a compression sealing gasket system for connecting the components 10, 10' comprises a gasket or a sealing gasket or a compression sealing gasket or a sealing system 14 (a gasket or a sealing gasket or sealing system in the rest of this description) that is arranged axially between the faces 12, 12' of the two components 10, 10' (or, in the example of FIG. 9, between the hole 100 and the flange 101). The sealing gasket 14 extends substantially in a plane, which is perpendicular to axis AA'. In this example, and in some of the examples below, the sealing gasket has a circular symmetry around axis AA'.

The sealing gasket or system comprises tightening means 30, for example bolts and nuts or bolting means that press axially one component 10 towards the other 10'.

The tightening means 30 also compress axially the sealing gasket 14 to provide a gastight connection between the two components 10, 10'.

According to the embodiment represented on FIG. 2, the face 12, 12' of each component 10, 10' comprises an annular recess 16, 16' in which at least part of the sealing gasket 14, 14' is received.

The combined axial depth of the recesses 16 and 16' is inferior to the height or the axial height of the gasket 14 before the two components 10, 10' are assembled (said height or axial height is measured along axis AA' or along an axis perpendicular to the plane in which the gasket extends). If there is only one recess, for example recess 16, then its axial depth is inferior to the axial height of the gasket 14 before the two components 10, 10' are assembled.

The compression of the gasket 14' by the tightening means 30 produces an axial deformation of the gasket 14 and maintains a pressure of the gasket 14 on the bottom of each recess 16, 16'.

Figure 3A:
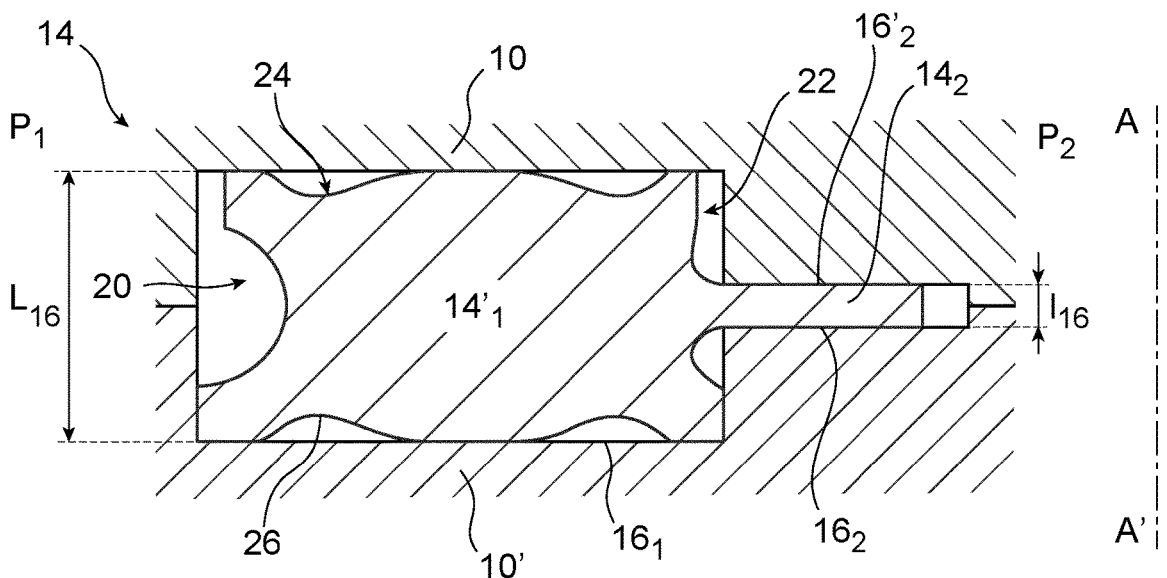
FIGS. 3A, 3B and 4A shows embodiments of a gasket according to the invention.
Figure 3B:
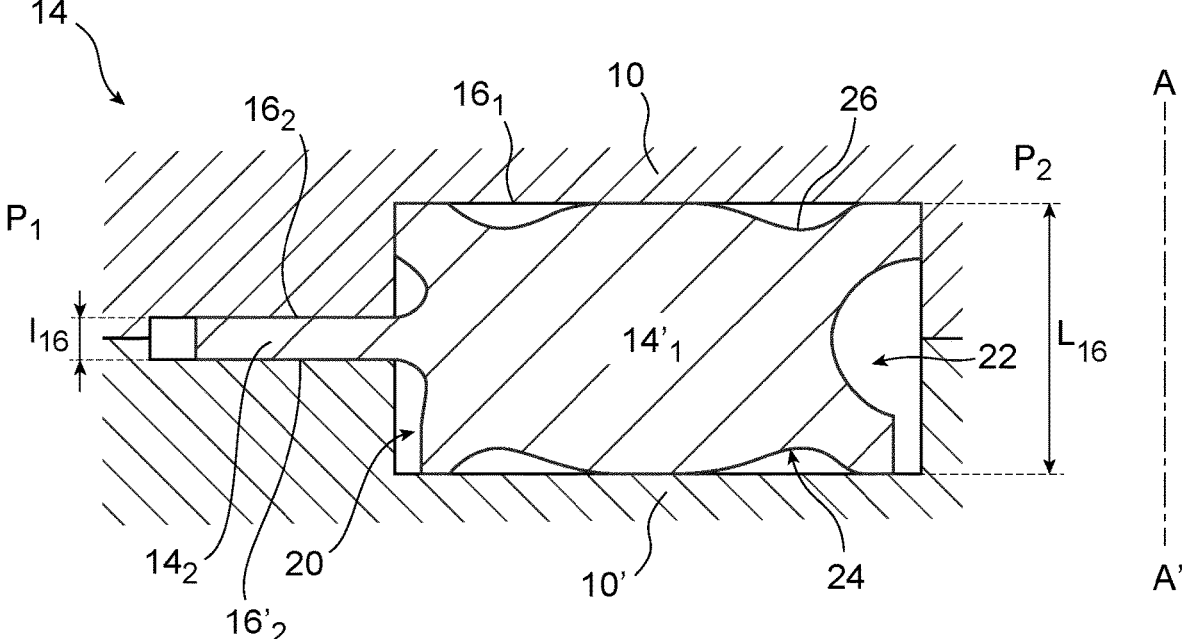
Figure 4A:
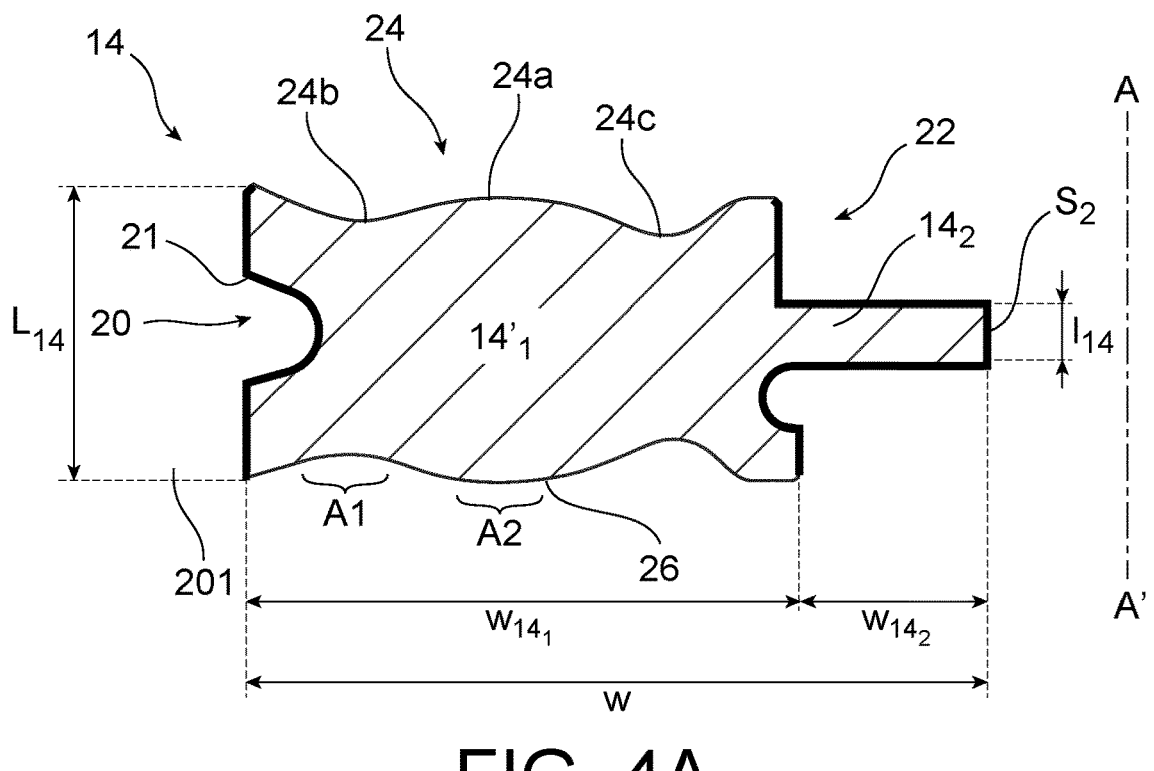

As can be seen from FIGS. 3A, 3B and 4A, the gasket 14 comprises a main body 14₁ made for example of a single material, for example of an elastomer like, as non-limiting examples, unmodified butyl rubber or modified butyl rubber, for example chlorobutyl (CIIR) or bromobutyl (BIIR) rubber.

The permeability of this elastomer with respect to the gas intended to fill the components 10, 10' results in a loss of gas during time.

As can be seen on FIGS. 3A, 3B and 4A, a section of the main body 14₁ of the gasket 14, along an axial plane containing main axis AA', can have a general rectangular shape.

The main body 14₁ of the gasket 14 comprises a radially outer side 20, a radially inner side 22 and two planar end faces 24, 26 that axially delimit the gasket 14 and connect the inner side 22 to the outer side 20.

Figure 5:
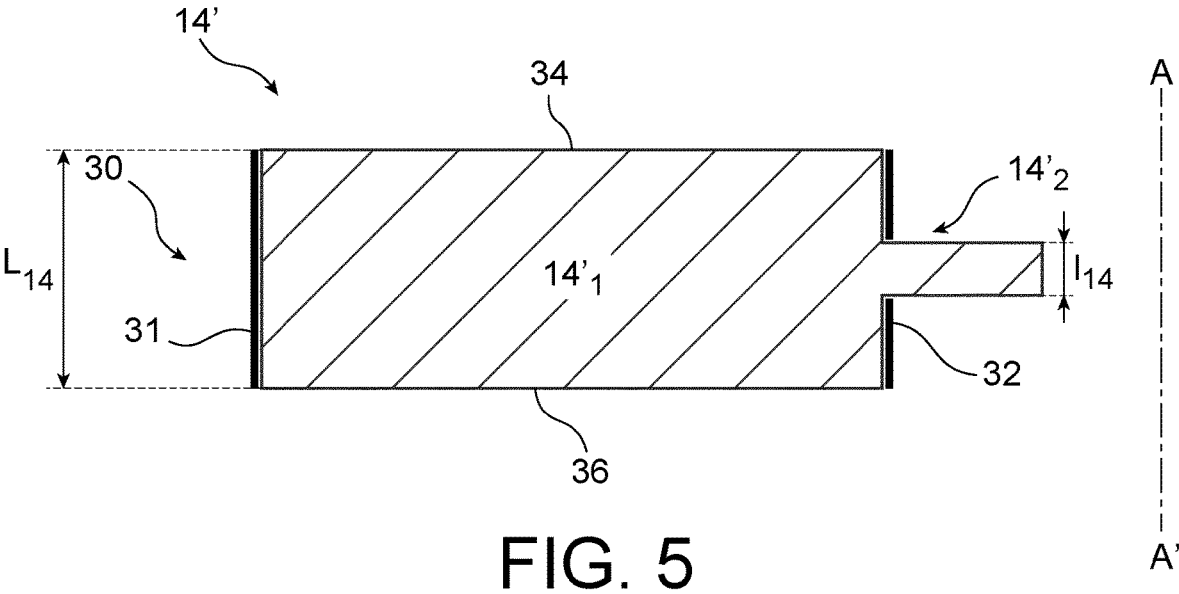
FIG. 5 shows another embodiment a gasket according to the invention.

One or more of the sides 20, 22, 24, 26 of the main body can be wave shaped to enhance the sealing. A wave shape comprises (see FIG. 4A) at least one protuberance or peak 24a and at least one recess or depression or valley 24b, 24c. The gas pressure has a positive effect thanks to this complex shape by creating the forces that increase the contact pressure of the gasket onto the surfaces of the recesses 16 and 16'. Alternatively, the sides and/or the end faces can have a different shape, or be rectilinear, as illustrated on FIG. 5 (see sides 30, 32 or end faces 34, 36).

Figure 11A:
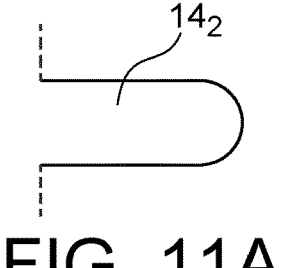
FIGS. 11A and 11B show alternative shapes of the lip(s).
Figure 11B:
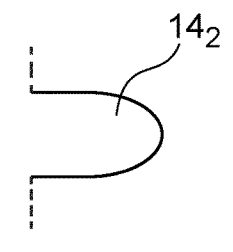

In order to reduce the permeability of the gasket 14 to:

a gas like heptafluoroisobutyronitrile and/or heptafluoroisopropyl trifluoromethyl ketone (also named 2-butanone, 1,1,1,3,4,4,4-heptafluoro-3-(trifluoromethyl)-(CAS No 756-12-7)), possibly mixed with a gas or a dilution gas comprising at least $CO_2$ and/or $O_2$ and/or $N_2$ and/or water vapor and/or an oxygenated compound;

or to a gas comprising at least $CO_2$ and/or $O_2$ and/or $N_2$ and/or an oxygenated compound, and/or water vapor, and/or to incoming water and/or incoming water vapor, said interface or said system being surrounded, or being intended to be surrounded, by an outer atmosphere containing some water and/or water vapor, at least one (or both) of the outer side 20 and the inner side 22 comprises a lip 14: (an inner lip on the example of FIG. 3A) which can have a substantially rectangular in a plane containing the axis AA' (as can be seen on FIGS. 3A, 3B, 4A and 5; other shapes are possible, for example at least partly rounded or at least partly circular or semi-circular, as can be seen on FIGS. 11A and 11B). Preferably, the lip(s) and the main body have the same composition (see the above examples of materials of the main body, the lip(s) preferably being made of the same material as the main body), the composition of the gasket being thus homogeneous.

Said inner lip has an extension (or thickness) $l_{14}$ measured along an axis parallel to the AA' axis less than the extension (or thickness) $L_{14}$ of the main body along the same axis, for example less than or equal to 50% of said extension (or thickness) $L_{14}$. The smaller the extension (or thickness) $l_{14}$ (or cross-section), the better the efficiency.

For example: the extension (or thickness) $L_{14}$ of the main body is between 3 mm and 25 mm and the extension (or thickness) $l_{14}$ ($<L_{14}$) of the lip is between 0.5 mm and 5 mm.

Figure 4B:
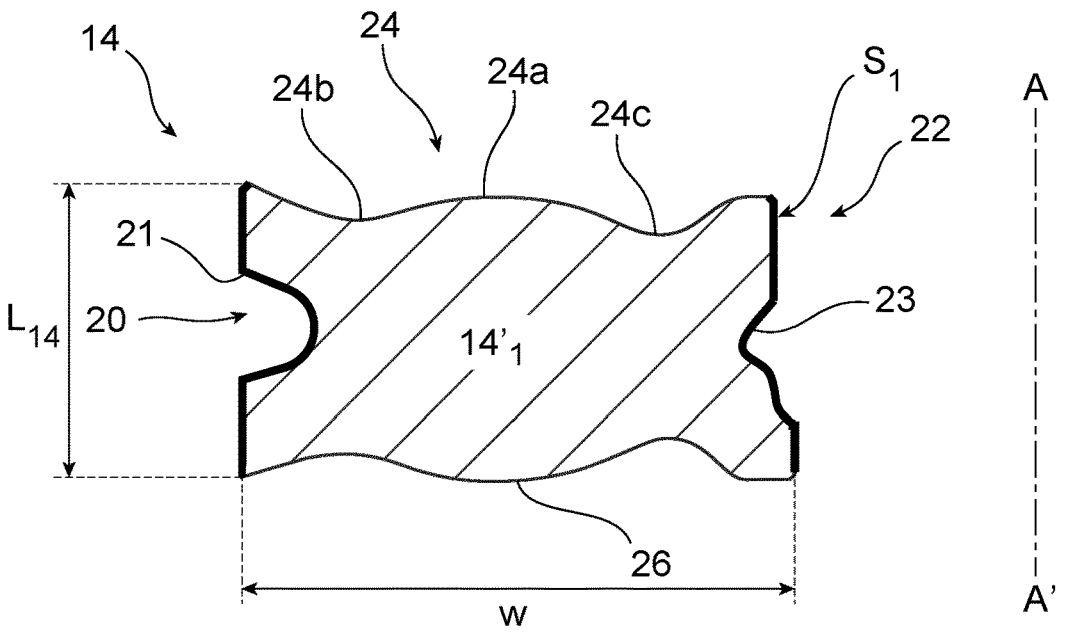
FIG. 4B shows a gasket according to the prior art.

The lip 14₂ offers a smaller surface area $S_2$ to gas (in particular from the above-mentioned list) permeating in a direction perpendicular to axis AA' and/or to incoming water and/or water vapor than the surface area $S_1$ of the inner side 22 and/or the outer side 21 of a known gasket (FIG. 4B) not having a lip 14₂.

Permeation (molecules going through the gasket) is linked to the surface area under pressure: due to its smaller extension $l_{14}$ along the axis AA' the lip 14₂ offers a reduced surface area $S_2$ to permeation.

In the embodiments of FIGS. 3A and 4A, the lip is an inner lip, oriented towards the part of the device having the highest pressure P2 in service conditions (the outside pressure of the device being P1<P2).

In other embodiments, as on FIG. 3B for example, the lip is an outer lip, oriented towards the outside part of the device, having the lowest pressure P1 in service conditions. A gasket provided with an outer lip as on FIG. 3B is particularly efficient to limit or to prevent water and/or water vapor permeation of $H_2O$ from outside the device provided with said gasket and is also efficient against gas (in particular from the above-mentioned list) permeating in a direction perpendicular to axis AA'.

Temporary inversion of the pressure difference direction is permitted by the design of the invention but preferably at a lower amplitude ((P1–P2)<2 bar). Preferably, the device is able to withstand vacuum (0 bar absolute inside (P2) and 1 bar absolute outside (P1)) before filling.

The width w (the path of the gas through the gasket) of the gasket is measured in the plane containing the AA' axis, along an axis perpendicular to AA'; it is for example between 4 and 10 mm or 40 mm.

In any embodiment according to the invention, the width $w=w_{141}+w_{142}$, $w_{141}$ (respectively $w_{142}$) is the width of the main body 14₁ (respectively the width of the lip 14₂), $w_{141}$ and $w_{142}$ (for example $w_{141} \geq w_{142}$) are both measured in the plane containing the AA' axis but along an axis perpendicular to AA'. Preferably: $w_{142} \geq 35\%$ $w_{141}$ or $w_{141} \geq w_{142} \geq 35\%$ $w_{141}$ (the longer path of the gas through the gasket, the better the efficiency of the gasket).

The main body 14₁ performs several functions: it is adapted to maintain a sufficient pressure on the surfaces to ensure tightness with consideration of thermal dilatations, ageing, manufacturing tolerances and environmental constraints. It also permits easier handling of the gasket during the assembly process.

Preferably, the inner or outer lip 14₂ usually has an average compression rate (for example between 15% and 40%) which is higher than the average compression rate of the main body 14₁ (for example between 10% and 25%). The respective recesses 16₁, 16₂ are preferably designed so that the lip is more compressed than the main body of the gasket. This ensures sufficient compression, preferably in all conditions and regarding the above-mentioned constraints. It can be noted that in the main body those portions $A_1$ (see FIG. 4A) having restrictions due to the recesses 24b, 24c have a smaller compression rate than the largest portions $A_2$.

The recess for a gasket according to the invention has:

a first large parallelepipedal shape (for the main body of the gasket) having an extension (or thickness) $L_{16}$ measured along an axis parallel to the axis AA';

and a second smaller parallelepipedal shape which has an extension (or thickness) $l_{16}$, also measured along an axis parallel to the AA', $l_{16}<L_{16}$.

Preferably the ratio $l_{16}/l_{14}$ is between 0.60 and 0.85 and/or the ratio $L_{16}/L_{14}$ is between 0.75 and 0.9;

Generally, a ratio $l_{16}/l_{14}<L_{16}/L_{14}$ is preferred (for a higher compression rate on the lip than on the main body).

Figure 6A:
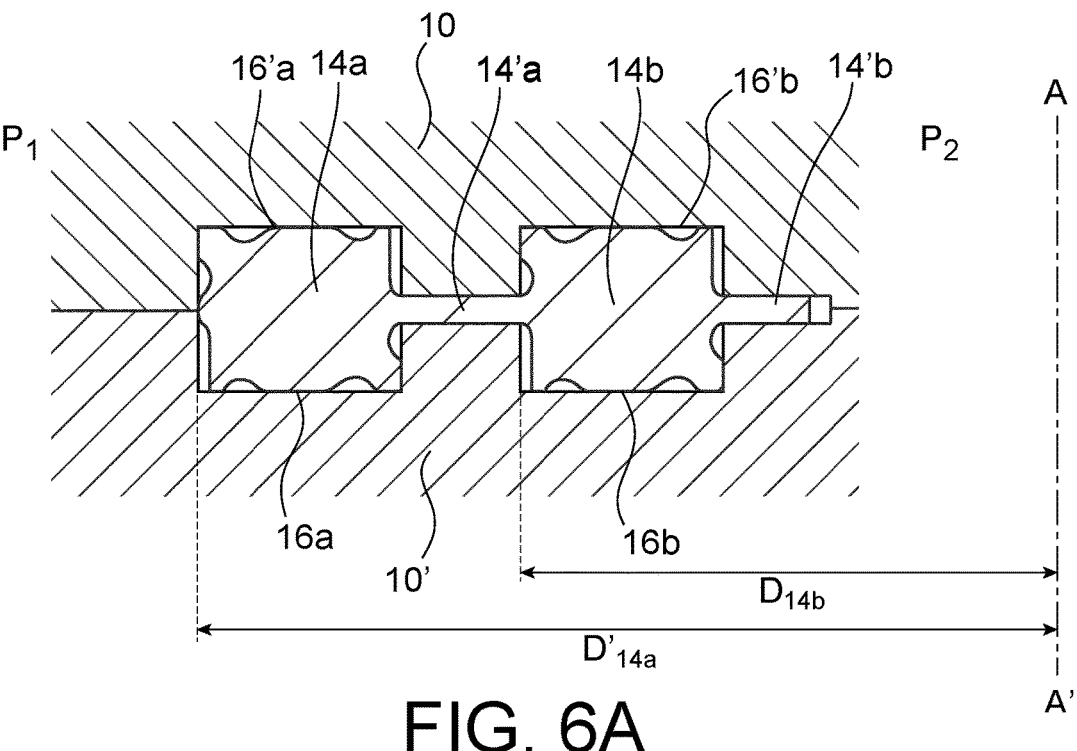
FIGS. 6A and 6B show further embodiments of a gasket according to the invention.
Figure 6B:
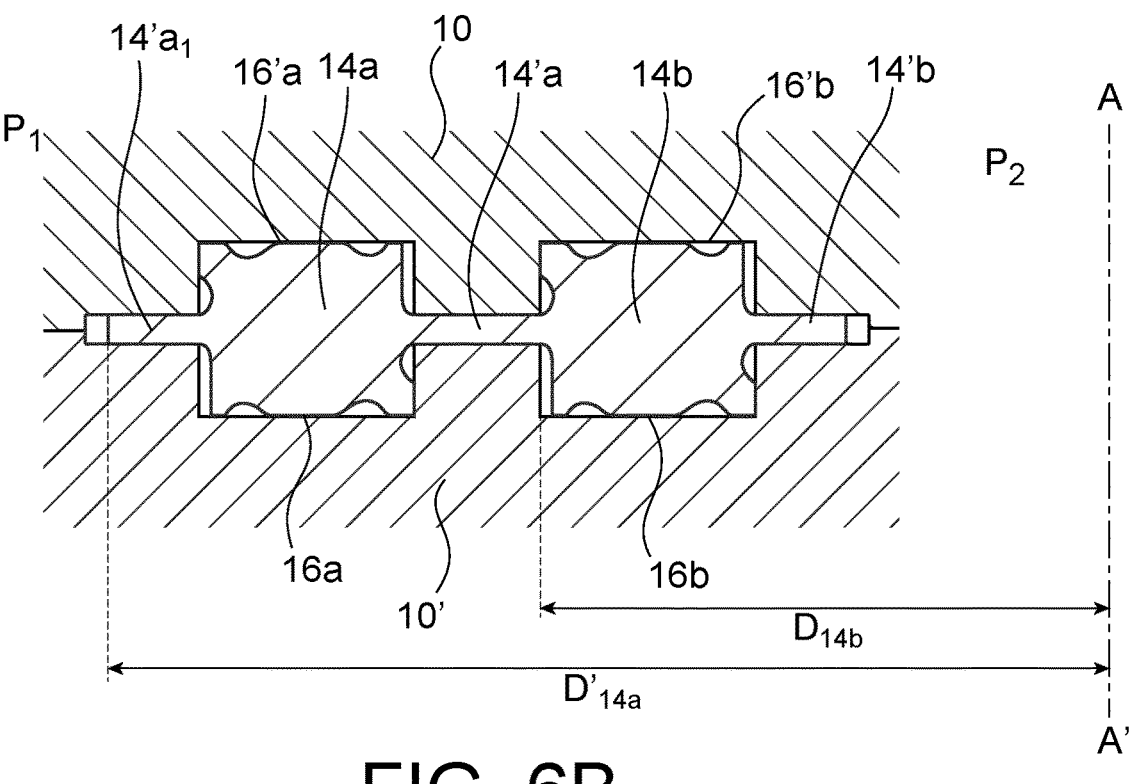

FIGS. 6A and 6B show particular embodiments of a gasket or a gasket system according to the invention, comprising two gaskets according to the invention in series:

a first (outer) gasket, which has (FIGS. 6A and 6b) a main body 14a (having an extension or thickness $L_{14}$ and a width $w_{141}$) and an inner lip 14'$a$ (having an extension or thickness $l_{14}$ and a width $w_{142}$) or (FIG. 6B) a main body 14$a$ (having an extension or thickness $L_{14}$ and a width $w_{141}$), an outer lip 14'$a_1$ (having an extension or thickness $l_{141}$ and a width $W'_{142}$) and an inner lip 14'$a$ (having an extension or thickness $l_{14}$ and a width $w_{142}$);

and a second (inner) gasket (FIGS. 6A and 6$b$), which has a main body 14$b$ (having an extension or thickness $L'_{14}$ and a width $w'_{141}$) and an inner lip 14'$b$ (having an extension or thickness $l'_{14}$ and a width $w_{142a}$), the inner lip 14'$a$ of the first (outer) gasket being connected to the outer side of the main body 14$b$ of the second (inner) gasket.

In both embodiments of FIGS. 6A and 6B, the inner gasket is on the side of the device having the highest pressure P2 in service conditions (the outside pressure of the device being P1<P2).

The first (outer) gasket has a lateral extension ($D_{14a}$ on FIG. 6A, $D'_{14a}$ on FIG. 6B) which is larger than the second (inner) gasket ($D_{14b}$ on both FIGS. 6A and 6B).

These 2 gaskets are adapted to corresponding double recesses 16$a$, 16$b$, 16'$a$, 16'$b$ as shown on FIGS. 6A and 6B.

The double structure of the gaskets or gasket systems of FIGS. 6A and 6B ensures a very high tightness with respect to the gases located on the pressure side of the device (at pressure P2>P1).

Each of the extensions or thicknesses $L_{14}$, $l_{14}$, $L'_{14}$, $l'_{14}$, $l_{141}$ is measured along an axis parallel to the AA' axis.

Each of $l_{14}$ and $l_{141}$ is less than the extension (or thickness) $L_{14}$, for example less than 50% of said extension (or thickness) $L_{14}$.

$l'_{14}$ is less than the extension (or thickness) $L'_{14}$, for example less than 50% of said extension (or thickness) $L'_{14}$.

Preferably: $l_{14}=l_{141}=l'_{14}$ and/or $L_{14}=L'_{14}$.

The above considerations about the widths of the main body and the width of the lip(s) may apply to the embodiments of FIG. 6A or 6B; preferably:

$w_{142} \geq 35\%$ $w_{141}$ or $w'_{142} \geq 35\%$ $w_{141}$; or $w_{141} \geq w_{142} \geq 35\%$ $w_{141}$ or $w_{141} \geq w'_{142} \geq 35\%$ $w_{141}$ or $w_{142}+w'_{142} \geq 35\%$ $w_{141}$ or $w_{141} \geq w_{142}+w'_{142} \geq 35\%$ $w_{141}$;
and/or: $w_{142a} \geq 35\%$ $w'_{141}$, or $w'_{141} \geq w_{142a} \geq 35\%$ $w'_{141}$.

Figure 7A:
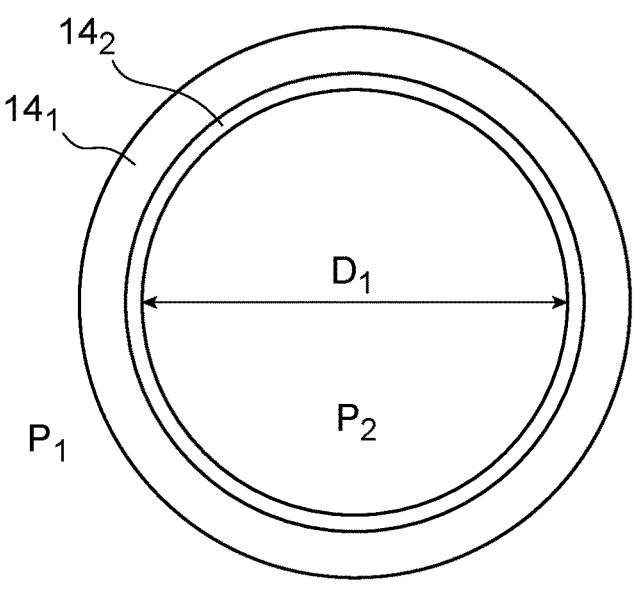
FIGS. 7A-7B are front views of various embodiments of gaskets according to the invention.

FIG. 7A is a front view in a plane perpendicular to the axis (AA') (or a view in the plane of the gasket) of a circular or annular gasket or gasket system according to the invention. It has an inner diameter $D_1$ (the inner diameter if the lip 14$_1$) which can for example be comprised between, on the one hand, 40 mm or 50 mm or 100 mm and, on the other hand, 500 mm or even 1300 mm. Such large gaskets are more critical in terms of tightness than the usual smaller gasket (of diameter comprised between 10 mm and 40 mm).

Figure 7B:
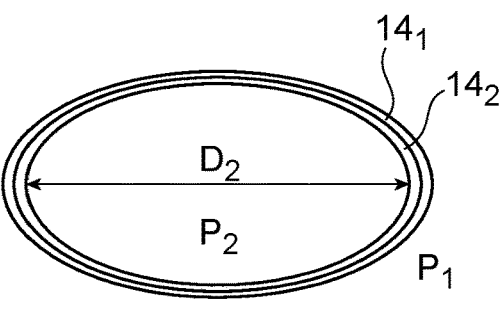

Alternatively, a gasket or a gasket system according to the invention can have in a plane perpendicular to the axis (AA') (or in the plane of the gasket) an elongated or oval or ellipsoidal shape (FIG. 7B), having a maximal inner dimension $D_2$ which can for example be comprised between, on the one hand, 40 mm or 50 mm or 100 mm and, on the other hand, 500 mm or even 1300 mm.

In general (for any of the embodiments of a gasket or of a gasket system according to the invention):

the lip extends along the whole length of the inner or outer side (or the whole inner or outer periphery) of the main body of the gasket;
and/or the lip is made of the same material as the main body.

Figure 8A:
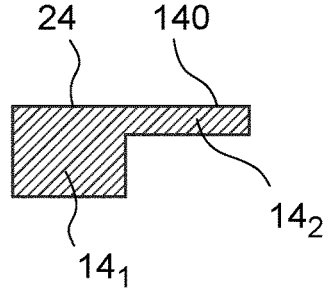
FIGS. 8A-8B show embodiments of gaskets according to the invention in the case of a system using a single recess.
Figure 9A:
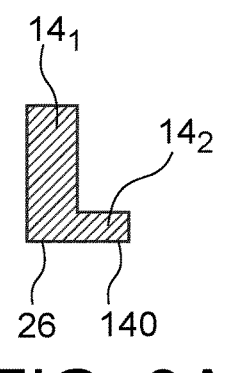
FIGS. 9A-9C show further embodiments of gaskets according to the invention in the case of a system using a radial recess instead of an axial one.
Figure 9B:
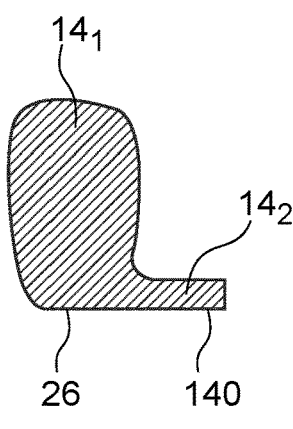

Variants of the invention are shown on FIGS. 8A, 9A and 9B, at the interface between two parts 10, 10': these gaskets have a "L" shape, the lip 14$_2$ having a face 140, perpendicular to said AA' axis, extending in a same plane as one of the lateral end faces 24, 26 of the main body 14$_2$ of the gasket.

Figure 8B:
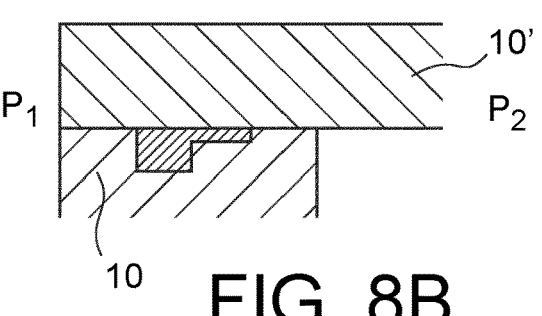

FIG. 8B shows the gasket of FIG. 8A in a corresponding recess having an "L" shape. In the embodiment of FIG. 8B, only one of the two parts 10, 10' has a recess.

Figure 9C:
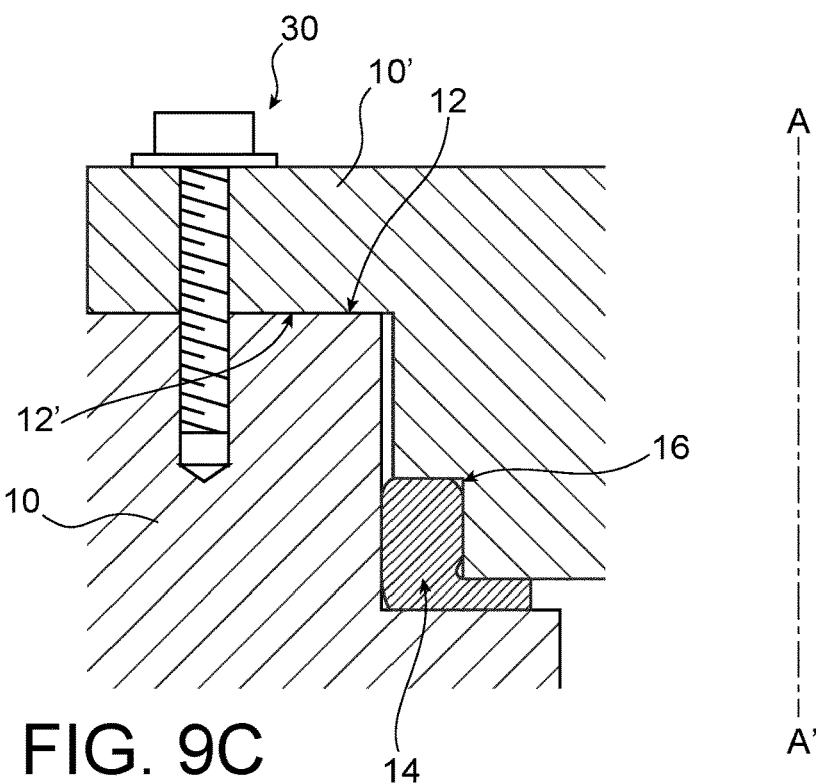
Figure 10:
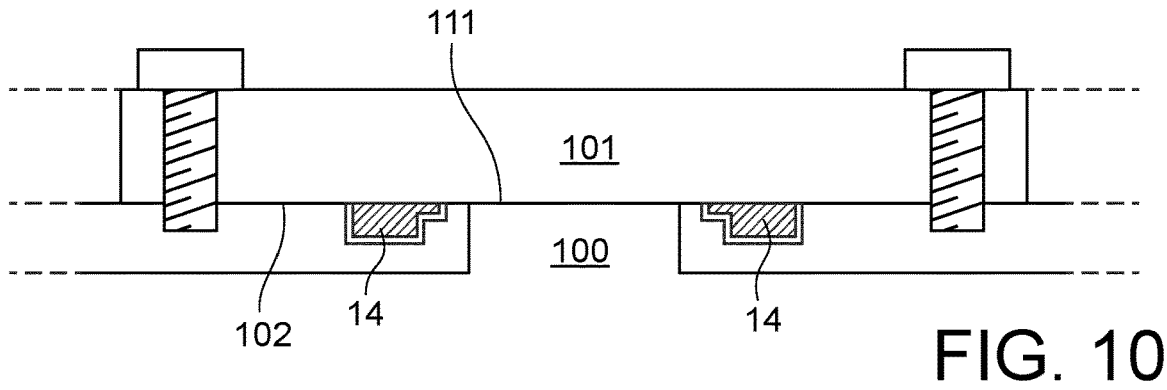
FIG. 10 is a schematic diagram of a high voltage apparatus comprising a hole of a gas compartment closed by a flange and comprising a gasket according to the invention.

In the embodiment of FIG. 9C, only the main body of the gasket, or part of said main body, of FIG. 9A or 9B is in a recess. As can be seen on this figure, the assembling faces of the two parts or of the two components are not contacting each other at least in an area surrounding the recess and/or the gasket (unlike the other FIGS. 2, 3A, 3B, 6A, 6B). More generally (the gasket having an <<L>> shape or any other shape), at least in an area surrounding the recess and/or the gasket, at least part of the end or assembly faces of the two components:

may be contacting each other;
or may not be contacting each other; in this last case, part of the gasket, for example one or more lip(s) or at least part of one or more lip(s), may not be in a recess, but may be for example between said assembling faces.

These embodiment of FIGS. 8A, 8B, 9A-9C can be adapted to smaller gaskets, for example having an inner dimension or diameter of between 40 mm (or 50 mm) and 200 mm with a more compact implementation than the previously presented embodiments. They are able to replace O-rings and are easier to integrate than the gaskets described above in connection with the preceding figures.

As illustrated on FIGS. 9A-9C, the main body of a gasket according to the invention can have an extension (or thickness or axial height) $L_{14}$ of the main body which is larger than the distance between its inner side 22 and its outer side 20 (measured in a plane perpendicular to the axis AA' or in the plane of the gasket). This applies to an "L" shaped gasket, but also to any other embodiment.

A gasket according to the invention can be formed by injection of a non-vulcanized (or uncured) material into a mold, followed by a compression step.

The invention applies for example to a switch, or to a circuit-breaker, or to a disconnector, or to a transformer, or to a surge-arresters, or to a gas-insulated line.

The invention claimed is:

1. A sealing system comprising two components of a gas insulated portion of a high or medium voltage apparatus, the gas insulated portion forming part of a switch, or of a circuit-breaker, or of a disconnector, or of a transformer, or of a surge-arresters, or of a gas-insulated line, in which each of the components comprises an end or assembly face that faces the end or assembly face of the other component, at least one of the assembly faces comprising at least one recess and wherein at least one compression sealing gasket is at least partly arranged in the at least one recess and is compressed between the assembling faces of the components, the compression sealing gasket comprising a main body of general planar extension, or extending in a plane, comprising an inner side and an outer side, and end faces, which delimit the gasket along an axis perpendicular to the plane, and connect the inner side and the outer side, made of an elastomer material, the main body having a first extension, along the axis, at least one of the inner side and the outer side being provided with a lip which has a second extension, along the axis perpendicular to the plane, less than the first extension.

2. A sealing system according to claim 1, wherein the first extension is comprised between 3 mm and 25 mm.

3. A sealing system according to claim 1, wherein the second extension is comprised between 0.5 mm and 5 mm.

4. A sealing system according to claim 1, wherein the second extension is <50% the first extension.

5. A sealing system according to claim 1, wherein the main body, respectively the lip, has a first width, respectively a second width, both widths being measured in the plane containing the axis and along an axis perpendicular to axis, such that the second width is >35% of the first width.

6. A sealing system according to claim 1, wherein the gasket has a maximum inner dimension between 50 mm and 1300 mm.

7. A sealing system according to claim 1, wherein the lip has an average compression rate higher than the main body.

8. A sealing system according to claim 1, wherein:

the outer side and the inner side are parallel and/or coaxial to each other;

and/or the gasket has in a plane perpendicular to the axis an annular or oval or ellipsoidal shape.

9. A sealing system according to claim 1, each of the inner side and the outer side being provided with a lip.

10. A sealing system according to claim 1, at least one of the end faces and of the outer side and the inner side has a wavy shape.

11. A sealing system according to claim 1, the lip having a side, perpendicular to the axis, extending in a same plane as one of the end faces.

12. A compression sealing gasket system according to claim 1, comprising a second sealing gasket, the second sealing gasket comprising a main body of general planar extension, or extending in a plane, comprising an inner side and an outer side, and end faces, which delimit the gasket along an axis perpendicular to the plane, and connect the inner side and the outer side, made of an elastomer material, the main body having a first extension, along the axis, at least one of the inner side and the outer side being provided with a lip which has a second extension, along the axis perpendicular to the plane, less than the first extension, the two sealing gaskets being in series, the lip of one of the gaskets being connected to the inner side or to the outer side of the other one of the gaskets.

13. A sealing system comprising two components of a gas insulated portion of a high or medium voltage apparatus, the gas insulated portion:

containing, or being intended to contain, a gas comprising at least:

heptafluoroisobutyronitrile and/or heptafluoroisopropyl trifluoromethyl ketone (also named 2butanone, 1,1,1, 3,4,4,4-heptafluoro-3-(trifluoromethyl)-(CAS No 756-12-7)), possibly mixed with a gas or a dilution gas comprising at least $CO_2$ and/or $O_2$ and/or $N_2$ and/or an oxygenated compound;

or to a gas comprising at least $CO_2$ and/or $O_2$ and/or $N_2$ and/or an oxygenated compound and/or water vapor;

and/or the gas insulated portion being surrounded, or being intended to be surrounded by an atmosphere containing some water and/or water vapor;

in which each of the components comprises an end or assembly face that faces the end or assembly face of the other component, at least one of the assembly faces comprising at least one recess and wherein at least one compression sealing gasket is at least partly arranged in the at least one recess and is compressed between the assembling faces of the components, the compression sealing gasket comprising a main body of general planar extension, or extending in a plane, comprising an inner side and an outer side, and end faces, which delimit the gasket along an axis perpendicular to the plane, and connect the inner side and the outer side, made of an elastomer material, the main body having a first extension, along the axis, at least one of the inner side and the outer side being provided with a lip which has a second extension, along the axis perpendicular to the plane, less than the first extension.

14. A method for insulating a gas insulated portion of a high or medium voltage apparatus, the portion:

containing a gas comprising at least:

heptafluoroisobutyronitrile and/or heptafluoroisopropyl trifluoromethyl ketone (also named 2butanone, 1,1,1, 3,4,4,4-heptafluoro-3-(trifluoromethyl)-(CAS No 756-12-7)), possibly mixed with a gas or a dilution gas comprising at least $CO_2$ and/or $O_2$ and/or $N_2$ and/or an oxygenated compound;

or to a gas comprising at least $CO_2$ and/or $O_2$ and/or $N_2$ and/or an oxygenated compound and/or water vapor;

and/or the gas insulated portion being surrounded, or being intended to be surrounded, by an atmosphere containing some water and/or water vapor;

the gas insulated portion comprising a sealing system according to claim 1.

15. A method according to claim 14, wherein the gas is contained in the apparatus at a pressure between 1 bar and 20 bar.

* * * * *